April 17, 1945.   F. A. LANFRANCONI   2,373,836
SCREW CUTTING DIE AND STOCK THEREFOR
Filed Nov. 16, 1943
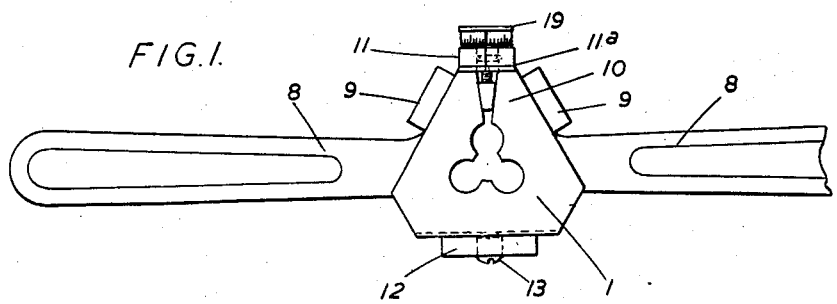
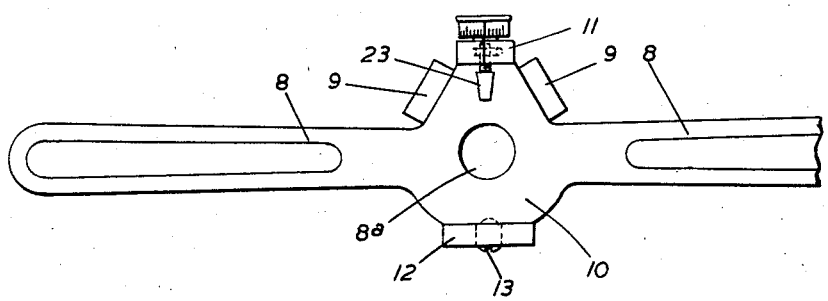
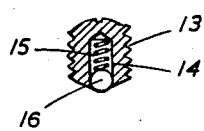
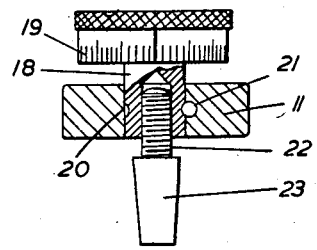
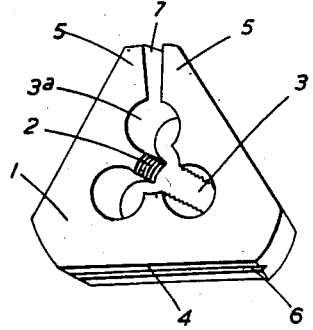
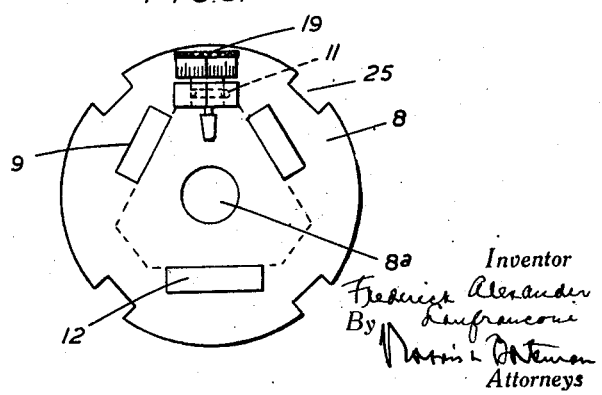
Inventor
Frederick Alexander
Lanfranconi
By
Attorneys Patented Apr. 17, 1945

2,373,836

UNITED STATES PATENT OFFICE 2,373,836

SCREW CUTTING DIE AND STOCK THEREFOR

Frederick Alexander Lanfranconi, Kingston-by-Pass, Surbiton, England

Application November 16, 1943, Serial No. 510,528
In Great Britain November 17, 1942

3 Claims. (Cl. 10—119)

This invention relates to improvements in dies and stocks used for screw thread cutting and the like.

Heretofore it has been customary to secure dies which are normally of circular contour within the stock holder by means of set or grub screws which extend from the external part of the stock and enter a recess in the metal of the die. This arrangement has the disadvantage that it takes time to insert and adjust the die in the stock, and the resistance to turning is imposed upon the relatively small area of locking screw intermediate the stock and die, in fact the whole torsional effort is placed upon said screw or screws as a shearing stress. This leads in time to further inaccuracies and wear, may produce a setting of the die that is angular to the work piece treated.

Additionally, no means whatsoever are provided for ascertaining in advance the degree of die opening prior to cutting, and in consequence the rod or screw shank treated may be under or over thread size, and since accuracy is required, it is a matter of trial and error until the exact dimensions for standard parts is achieved.

The object of the present invention is to overcome these difficulties and to give such an external contour to the die that it is automatically locked by appropriate recesses in the stock, and thus enable the stock itself, instead of grub screws or equivalent inserted therethrough, to receive the stresses set up in the operation of rotating the said stock in thread cutting.

A further object of the invention is to provide means whereby the normal opening of the die is adjusted with equal accuracy on both sides of the die slot, and wherein the die rests and is maintained within the stock at the same level throughout operational use.

The invention consists in the manufacture of screw cutting dies and stocks wherein the die is formed with a triangular contour in combination with a stock which is conveniently recessed to receive said die, of security devices for retaining and leveling said die within said stock, and of an adjustable device with a vernier setting mounted within said stock and adapted to enter the opening of said die.

In order that the invention may be more particularly ascertained, reference is made to the accompanying drawing wherein a preferred embodiment is illustrated and described, and wherein Fig. 1 is a plan view showing the die and stock assembled as an operative unit, Fig. 2 shows a detail of the die, in perspective, Fig. 3 is a plan view of the stock, Fig. 4 is an enlarged view of the security locking device, Fig. 5 shows a detail of the vernier adjustment, and Fig. 6 shows a stock suitable for machine tools.

The die 1, see Fig. 2, is made from steel or like suitable metal and is of triangular shape with truncations occurring at the angles. If the sides were extended the triangle would be an equilateral triangle and each angle of 60°. The degree of truncation preferably leaves each truncated side of equal length, but the degree of truncation may be varied. The thread cutting teeth 2 are centrally disposed, and the swarf clearance holes 3 aligned with the angles. For the purpose of description the part 4 may be termed the base and the part 5 the apex. The base 4 has a longitudinal groove 6 cut midway in its depth, whilst at the apex 5 the usual adjustment slot 7 is cut between the hole 3a on a centre line bifurcating the apex angle. This slot may have inclined or straight sides. The stock 8 (see Fig. 3) is preferably formed as a hot metal stamping out of plate and has a central orifice 8a. The stock is blanked first and the ears 9 then turned at right angles to form flanges or walls to constitute a triangular socket 10 which will accommodate the die. The flange part 11 at the apex is positioned to leave a small space 11a between its inner wall and the face opposed 5 of the die. The said part 11 also accommodates the die opening adjustment device, whilst the base flange 12 accommodates the setting and security device 13. The said part 13 consists of a grub or headed screw which is internally bored as at 14 (see Fig. 4) and has an internal spring 15 and a ball 16, the latter being retained by spinning over the end of the grub screw as shown; this leaves about one-third of the surface of the ball protruding. The said ball is adapted to enter the groove 6 in the base 4 of the die 1 when the stock and die are assembled.

The adjustment device (see Fig. 5) consists of pin 18, which has a vernier marked head 19. The pin 18 is journalled in the apex flange 11, and formed with a circumferential groove 20. A dowel pin 21 is inserted in flange 11 to lock the pin 18 from axial movement, whilst permitting rotation; the said pin is internally bored and threaded and receives the screwed shank 22 of a wedge or shim 23.

The operation of the invention is as follows:

The die 1 is inserted in the stock 8, the adjustment wedge 23 being withdrawn, which allows the latter to nest within the slot 7. The die as manufactured is for cutting threads upon stock of standard diameter and the adjustment device 23 is caused to move forward until contact is made with the sides of the slot 7. The locking screw 13 is now screwed home tight, the wedge action of the triangular die contour against the inner walls of the inclined flanges 9 tending to move the die forward by closing the slot 7, with equal pressure on both side walls of the die contiguous the slot, but such movement is denied by the part 23; the diameter to be cut by the die is now fixed. The diameter cut by the die may be increased by release of the screw 13 and movement of the wedge 23 downward. If on account of wear or for other reasons the die requires closing, the opening 7 in the die may be made to close by an operation the reverse of the above, i. e.: The wedge 23 is withdrawn and the setting screw 13 advanced; this causes the sides of the die to engage the converging sides of the walls of stock flanges 9. Normally the die is exact at insertion; the increase or decrease in diameter of the thread cut can be predetermined in terms of the thread upon the insertion piece 23.

In Fig. 6 is shown a stock suitable for use with machine tools. In such construction the stock 8 is made as a circular fitting for insertion in the head stock by means of a chuck or collet (not shown) or the periphery may be dog notched as at 25 for jaw chuck engagement.

Although in the foregoing description a preferred embodiment has been described, it is obvious that deviations may be made in the design within the ambit of the invention. Thus, the triangular cavity of the stock may be made with solid walls as a hot stamping or as a casting or the adjustment device for plus or minus diameters varied. For instance the slot in the die may be of wedge formation with an engaging wedge as shown, or a shim or straight piece used for opening, operating in a straight sided slot, a variety of shims of differing widths being provided as interchangeable units for the adjustment device 19. Further in dies for automatic machines four, five or more clearance holes may be made, and in such case the slot is interposed between the apex contiguous holes.

I claim:

1. A screw cutting die and stock therefor, characterized in that the die is formed as a triangular member slotted at its apex upon a line at right angles to its base, and the stock is correspondingly recessed to receive the die and wherein the torsional forces of the die when cutting are transmitted to the engaging walls of the stock, in combination with a vernier adjustable wedge carried by the stock and engaging in the slot in the die.

2. A screw cutting die and stock therefor, characterized in that the die is formed as a triangular member slotted at its periphery, and the stock is correspondingly recessed to receive the die and wherein the torsional forces of the die when cutting are transmitted to the engaging walls of the stock, combined with a die adjusting device comprising an axially fixed but rotatable vernier pin mounted on the stock, and an adjustment member screw threaded within said pin and movable thereby forwardly and backwardly, said adjustment member engaging said slot in the die.

3. A screw cutting die and stock therefor, characterized in that the die is formed as a triangular member slotted at an apex thereof, and the stock is correspondingly recessed to receive the die and wherein the torsional forces of the die when cutting are transmitted to the engaging walls of the stock, a clearance being provided between the apex face of the die and the inner face of the wall of the stock, in combination with means for adjusting the partial opening or closing of the slot in the die comprising means for advancing or withdrawing contact of the die with the converging walls of the stock and for locking the die in such an adjustment, and a setting device, and means on the setting device and cooperative with a vernier on the stock to indicate the adjustment.

FREDERICK ALEXANDER LANFRANCONI.